United States Patent [19]

Supra

[11] Patent Number: 4,955,099
[45] Date of Patent: Sep. 11, 1990

[54] MOVABLE SUPPORT

[75] Inventor: Carl F. W. Supra, Transvaal, South Africa

[73] Assignee: Liberty Pool Products S. A., Geneva, Switzerland

[21] Appl. No.: 307,048

[22] Filed: Feb. 7, 1989

[30] Foreign Application Priority Data

Apr. 13, 1988 [ZA] South Africa ............... 88/2572

[51] Int. Cl.⁵ ........................................ B60B 37/00
[52] U.S. Cl. .................................... 15/1.7; 16/45; 16/46; 16/26; 16/88; 16/DIG. 27; 301/1; D8/375
[58] Field of Search ................................. 16/24–27, 16/45–48, DIG. 27, 88; D8/375; 301/1; 15/1.7

[56] References Cited

U.S. PATENT DOCUMENTS

| | | | |
|---|---|---|---|
| 3,402,558 | 9/1968 | Hellinger | 16/48 |
| 3,626,535 | 12/1971 | Bond | 15/1.7 |
| 3,790,979 | 2/1974 | Foster | 15/1.7 |
| 3,922,754 | 12/1975 | Anderson | 16/47 |
| 4,624,028 | 11/1986 | Wilkes | 16/48 |

FOREIGN PATENT DOCUMENTS 211103 9/1986 Japan ............................. 16/45

Primary Examiner—Richard K. Seidel
Assistant Examiner—Edward A. Brown
Attorney, Agent, or Firm—Jones, Tullar & Cooper

[57] ABSTRACT

A movable support which includes a first axle, two stub axles which are in line with one another and which extend in opposing directions from the first axle at right angles thereto, and two hemispherical members which are mounted, with respective convex surfaces outermost, for independent rotation on the respective stub axles, on opposing sides of the first axle. The movable support finds particular application in supporting a cleaning head of a suction type pool cleaner.

4 Claims, 1 Drawing Sheet

MOVABLE SUPPORT

BACKGROUND OF THE INVENTION

This invention relates to a movable support which in very general terms can be said to be similar to a castor.

A trailing castor provides wheeled support for an object which may be moved in different directions with the disposition of the axis, about which the castor wheel rotates, changing as required It is necessary though for movement of the object actually to take place before the orientation of a castor is altered. In certain applications this lag, or dead space, is not acceptable.

It is also known to make use of a sphere which projects from, and which is held captive partially within, a cylinder. This type of arrangement permits immediate movement of the support in any direction, for all practical purposes eliminating any lag, but due to the close fit between the sphere and its support within the cylinder the operation of the device can be affected by grit which may become lodged between the surface of the sphere and an opposing surface of the sphere support.

SUMMARY OF THE INVENTION

The invention provides a movable support which has a substantially spherical shape and which includes two adjacent substantially hemispherical members which are mounted, with respective convex surfaces outermost, for independent rotation about a first axis which extends through a central region of each member, and for rotation, together, about a second axis which is transverse to the first axis.

The hemispherical members may be solid or hollow. In the latter case each hemispherical member may comprise a shell with a hollow interior.

The first axis may have aligned on it two stub axles which extend from a common base in opposite directions, each hemispherical member being mounted on a respective stub axle.

The second axle may be located between opposing surfaces of the hemispherical members. The second axis may have aligned with it oppositely directed axle ends which project from a space between opposing surfaces of the hemispherical members.

Substantially all of the space between opposing surfaces of the hemispherical members may be occupied by means of a flat circular disc.

The support of the invention finds general application for supporting practically any object which from time to time is to be moved in different directions. In particular the support is well suited for use with a pool cleaner which includes a cleaning head which traverses a submerged surface which is to be cleaned. The cleaning head, according to this aspect of the invention, is mounted on one or more of the movable supports in such a way that random movement of the cleaning head over the submerged surface is possible with a minimal amount of drag, lag or other possibly adverse effects.

BRIEF DESCRIPTION OF THE DRAWINGS

The invention is further described by way of example with reference to the accompanying drawings in which.

DESCRIPTION OF PREFERRED EMBODIMENT

Figure 1:
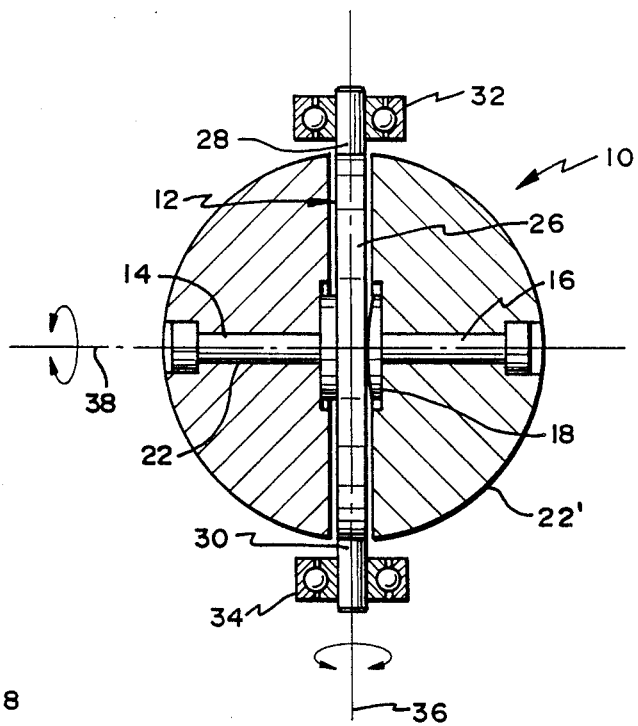
FIG. 1 is a view in cross section of a movable support according to the invention.
Figure 2:
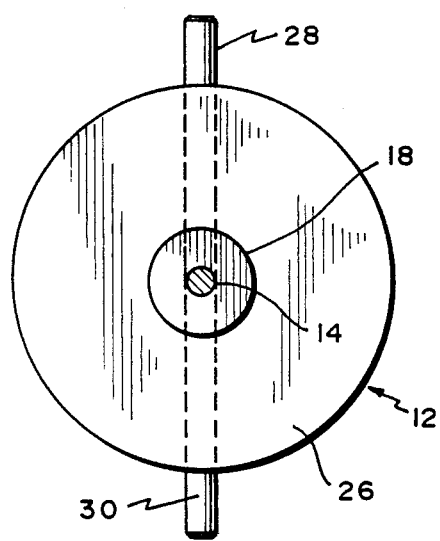
FIG. 2 is a side view of a central component of the movable support of FIG. 1.

FIG. 1 illustrates a movable support 10 according to the invention which includes a central member 12, which is shown from the side in FIG. 2, stub axles 14 and 16 which project in opposing directions from a common base 18 on the central member 12, and adjacent hemispherical members 20 and 22' respectively which are mounted for independent rotation on the stub axles 14 and 16 respectively.

Each hemispherical member is, in this example, solid and is made from a hard resilient or rubber-like material. A bore 22 extends through a central region of each hemisphere and acts as a bearing surface for the stub axle which is located within the bore. A suitable fixing means 24 is located in a small recess, at an outer end of the bore 22, and is engaged with the outermost end of the respective stub axle. For example the ends of the stub axles may be threaded and the fixing means may comprise nuts which are threadedly engaged with the stub axles.

The central member 12 includes a flat disc 26 of circular outline and two diametrically opposed axle ends 28 and 30. In use the axle ends are mounted in suitable bearings 32 and 34 respectively, or other low friction devices. Alternatively the axles ends themselves are made from a suitable low friction material.

The thickness of the disc 26 is such that it neatly fills the gap between opposed surfaces of the hemispherical members 20 and 22'. For practical purposes the assembly of the central member 12 and the hemispherical members 20 and 22', disregarding the axle ends 28 and 30, is spherical.

The assembly shown in FIG. 1 is rotatable in either sense of rotation about an axis 36 which passes through the axle ends 28 and 30. The hemispherical members 20 and 22' are, on the other hand, independently rotatable, again in either sense of rotation, about an axis 38 which passes through the stub axles 14 and 16 and which is at right angles to the axis 36.

The movable support 10 can be used for supporting practically any type of object. Depending on the size and mass of the object use may be made of a plurality of the supports.

As shown in FIG. 1 the axle ends 28 and 30 are mounted in bearings, bushes, sleeves or the like which are secured to the underside of the object which is to be supported. When the object is moved, say transversely to the axis 36, the hemispherical members 20 and 22' rotate in unison about the axis 36. If the direction of movement is parallel to the direction of the axis 36, i.e. transverse to the axis 38, then the hemispherical members rotate, about the stub axles to permit this movement. If the direction of movement lies between the directions of the axis 36 and axis 38 respectively then the resulting movement of the support is more complex for both hemispherical members rotate about the axis 36, while at any given moment the hemispherical member which is engaged with the ground rotates about the stub axle on which it is mounted to permit the required movement to take place without having the hemispherical members sliding over the ground.

If either of the fixing means 24 is on the ground, and there is an attempt to move the object in a direction which is parallel to the axis 36, then a small dead spot or lag is encountered. This is due to the fact that the lowermost hemispherical member is not able to rotate freely about its stub axle. This is not particuarly significant and if necessary can largely be overcome by mounting small rollers at the fixing points 24 aligned in such as a way to be rotatable about axes which are transverse to the axes 36 and 38.

Figure 3:
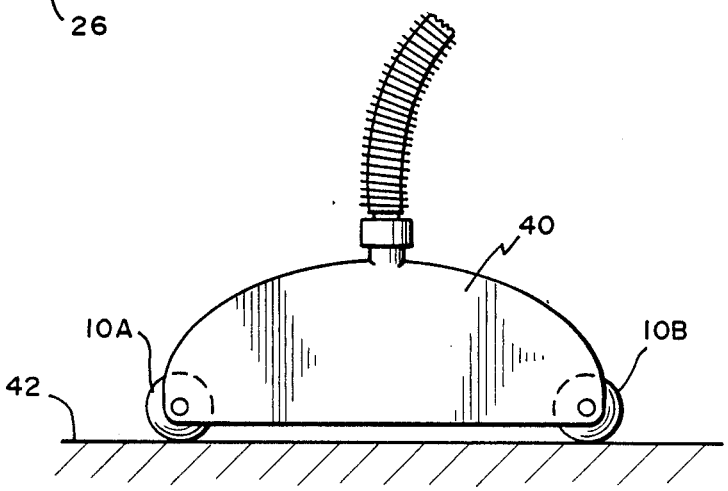
FIG. 3 is a schematic representation of the manner in which a plurality of supports may be used together with a suction type pool cleaner.

FIG. 3 illustrates schematically the use of multiple supports, although only two supports marked 1OA and 1OB are visible, to support a cleaning head 40 of a suction type pool cleaner. The supports rest on a submerged surface 42 of a swimming pool with the head 40 immersed and spaced from the surface. The supports are preferably positioned in such a way that, viewed in plan, portions of the hemispherical members project or protrude beyond the outer surface or outline of the head 40 and consequently support the head from below and at the same time provide outwardly extending surfaces which will be brought into contact with a side wall of the swimming pool when the head approaches the side wall. The projecting hemispherical members consequently act as guides which deflect, or turn aside, the head 40, in a random manner, ensuring that the head can move freely over the submerged surface.

It is repeated that the movable support of the invention, although particularly suited for use with a cleaning head of a pool cleaner, has many applications and can be used for supporting a large number of different types of objects.

I claim:

1. A swimming pool cleaner useable to clean a submerged swimming pool surface, said swimming pool cleaner comprising:

a suction head movably supported spaced from the pool surface to be cleaned; and a plurality of movable supports affixed to, and movably supporting said suction head, each of said movable supports having a first axle rotatably supported by said suction head, and first and second stub axles, said first and second stub axles being attached to said first axle and extending in opposing directions generally perpendicular to, and away from, said first axle, said first and second stub axles rotatably supporting first and second hemispherical members for independent rotation of said first and second stub axles on opposing sides of said first axle, each of said movable supports being affixed to said suction head to position a surface portion of one of said first and second hemispherical members projecting beyond an outer peripheral surface portion of said suction head.

2. The swimming pool cleaner of claim 1 wherein said first axle has first and second axle ends which are each secured to, and extend outwardly from, diametrically opposed portions of a peripheral surface of a central member having a planar disk body with first and second opposing flat sides, and further wherein said first and second stub axles are attached to said planar disk body generally at the centers of said first and second opposing flat sides, and further wherein said peripheral surface of said central member is sized to cooperate with outer peripheral surfaces of said first and second hemispherical members to provide a substantially spherical shape for said movable supports for said swimming pool cleaner.

3. The swimming pool cleaner of claim 1 wherein each of said first and second hemispherical members is solid.

4. The swimming pool cleaner of claim 1 wherein each of said first and second hemispherical members is a shell with a hollow interior.

* * * * *